United States Patent [19]

McEwan et al.

[11] 4,139,352

[45] Feb. 13, 1979

[54] GAS LIQUID SEPARATOR

[75] Inventors: Malcolm W. McEwan; Marius B. Teekens, both of The Hague, Netherlands

[73] Assignee: Shell Oil Company, Houston, Tex.

[21] Appl. No.: 886,505

[22] Filed: Mar. 14, 1978

[51] Int. Cl.² ............................................. B01D 19/00
[52] U.S. Cl. ........................................ 55/159; 55/201
[58] Field of Search .................... 55/48, 49, 159, 183, 55/185, 199, 201, 413–416, 190–193

[56] References Cited

U.S. PATENT DOCUMENTS

| 1,509,911 | 9/1924 | Stebbins | 55/413 |
| 4,046,528 | 9/1977 | Liljestrand | 55/201 |

FOREIGN PATENT DOCUMENTS

| 7512807 | 5/1976 | Netherlands | 55/159 |
| 104183 | 2/1918 | United Kingdom | 55/199 |

*Primary Examiner*—Frank A. Spear, Jr.
*Assistant Examiner*—Richard W. Burks

[57] ABSTRACT

An improved process and apparatus is described for separating a gas from an upwardly flowing gas-liquid mixture at the top of a vertical reactor or tube covered by a separator hood in which the upper or overflow edge of the upflow tube is extended and modified by a series of vertical partitions traversing the space directly above the upflow tube and extending outwardly therefrom to afford a series of adjacent, alternating riser and downcomer compartments, the riser compartments being bottomless in the space directly over the upflow tube and the downcomer compartments being bottomless in the space outside the top of the upflow tube, such that any liquid being separated from the gas-liquid mixture first passes through a riser compartment and over a partition into a downcomer compartment before it is collected for withdrawal. This improved apparatus and process has special application in disengaging gas from a liquid-solid slurry such as is conventionally encountered in Fischer-Tropsch synthesis of liquid hydrocarbons from gaseous reactant streams.

9 Claims, 4 Drawing Figures

GAS LIQUID SEPARATOR

BACKGROUND OF THE INVENTION

This invention relates to an apparatus and process for separating gas-liquid mixtures. More particular, this invention is directed to an improved means of disengaging gas from a gas-liquid mixture at the top of a vertical, upflow reactor or tube in which the liquid overflow from the tube or reactor is modified by directing the liquid flow through a series of alternating riser and downcomer compartments placed at the top of the upflow reactor or tube.

Systems for separation of heterogeneous mixtures containing components of different densities—i.e. a gas dispersed in a denser, continuous liquid phase—by decantation in a dynamic or upflow apparatus are known, For example, Netherlands Pat. No. 7,512,807 describes a separation apparatus comprising a central, cylindrical upflow tube or bubble column which opens at its top, via an overflow edge, into a separator hood fitted over and around the top of the upflow tube, said separator hood having a gas outlet above the overflow edge and a liquid outlet below the overflow edge and outside the upflow tube. With the separation apparatus of this Netherlands patent, the top circumference of the upflow tube itself as the liquid overflow edge; liquid flowing directly from the upflow tube over the uppper surface of the upflow tube into the annulus formed by the lower portion of the separator hood for collection and subsequent removal via the liquid outlet.

It has now been determined that the degree to which a separation between gas and liquid is effected by means of the above-mentioned apparatus depends on the combined effect of a residence of the phases to be separated in the separator hood and of the movement of the phases over the overflow edge. In certain applications it has been found, when using the above-mentioned simplest embodiment of the separating device, that the effect of the circular overflow edge alone does not bring about an adequate separation. One such application where inadequate separation is obtained is the synthesis of hydrocarbons from synthesis gas in a slurry type reactor in which the catalyst is suspended in recycled liquid product or in a circulating auxiliary liquid and wherein the liquid and catalyst, after having been separated from unconverted gas and gaseous by-products at the top of the upflow reactor, are cooled outside the reactor and recycled to the bottom of the reactor. In cases such as this, the separation then has to be completed in the space of the separator hood outside the upflow tube where, below the overflow edge, a liquid level must be maintained with a very large surface area. This, in turn, calls for an outer diameter of the separator hood many times larger than that of the upflow tube or reactor which is unacceptable in practice.

The present invention provides a solution to this problem of inadequate separation of phases while at the same time avoiding the disadvantages attributable to the need for a large liquid surface area in the separator hood of the prior art gas-liquid separation apparatus.

SUMMARY OF THE INVENTION

It has now been found that improved separation of gas and liquid phases can be obtained at the top of a vertically oriented, up flow reactor or tube emptying into, and enclosed by, a separator hood if the overflow edge at the top of the upflow tube or reactor is lengthened in contrast to enlarging the liquid surface area in the separator hood. Thus, according to the invention the overflow edge at the top of the upflow tube or reactor is formed by a system of vertically oriented partitions which traverse the space directly above the upflow tube and continue outwardly into the space in the separator hood next to the upflow tube. These partitions divide the space in the separator hood directly above the upflow tube and the space next to it into two kinds of opened topped compartments, each compartment extending in the space over the upflow tube and into the space adjacent to it. One kind of compartment consists of risers which have no bottoms in the space over the upflow tube and which do have bottoms in the space next to it, whereas the other kind of compartment consists of downcomers which do have bottoms in the space over the upflow tube and have no bottoms in the space next to it. The positioning of the riser and downcomer compartments is such that a riser and a downcomer are always side by side and have one partition in common. Thus, essentially the top edges of all the partitions together function as the overflow edge. The liquid ascends from the upflow tube into a riser compartment between the two partitions forming the riser. The liquid is then present not only in the bottomless part of the riser that is located in the space over the upflow tube but also in the other part of the riser which is located in the space next to the space over the upflow tube and which does have a bottom.

The present invention contemplates both an improved gas-liquid separation apparatus and a process for separating gas-liquid mixture, including solids-containing slurries, utilizing the improved apparatus. In its broadest aspects the improved gas-liquid separation apparatus of the invention comprises a vertically oriented, central upflow tube opening at its upper end into a separator hood which is fitted over and around said upflow tube thereby providing an enclosed space above the upper end of the upflow tube for gas collection and an enclosed space outside and below the upper end of the upflow tube for liquid collection, said separator hood being equipped with a gas outlet above the upper end of the upflow tube and a liquid outlet below the upper end of the upflow tube; liquid communication between the upflow tube and the separator hood being provided by an overflow edge at the upper end of the upflow tube made up of a series of vertically oriented partitions which traverse the space directly above the upflow tube and extend outwardly into the space adjacent to the upper end of the upflow tube bounded by the separator hood, thereby dividing the lower portion of the space in the separator hood into a series of adjacent, open top compartments of alternating types, one type of compartment being a riser which is bottomless in the space over the upflow tube and which has a bottom in the space outside the upper end of the upflow tube such that the gas-liquid mixture being separated can flow in an upwards direction into and over the upper edge of the compartment and the other type being a downcomer which has a bottom in the space over the upflow tube and is bottomless in the space outside the upper end of the upflow tube such that the liquid portion of the liquid mixture being separated can flow in a downwards direction from the upper edge of the compartment into the liquid collection space bounded by the separator hood, the arrangement of adjacent riser and downcomer compartments being such that any liquid being separated from the gas-liquid mixture in the upflow tube first passes through a riser compartment and over a partition into a downcomer compartment before it passes into the liquid collection space bounded by the separator hood outside and below the upper end of the upflow tube.

DESCRIPTION OF THE PREFERRED EMBODIMENTS

With the liquid overflow edge formed by the alternating riser and downcomer compartments in the apparatus of the invention, the liquid may flow over the edge of one of the two partitions that form the riser into an adjacent downcomer compartment. In this regard, there are two possible routes for liquid flow, specifically:

a. the liquid flows over the partition directly above the upflow tube and then plunges from the part of the riser over the upflow tube into that part of a downcomer having a bottom which is likewise located over the upflow tube, whereupon the liquid flows along the bottom in the downcomer to the bottomless part of the downcomer located next to, but outside of, the space over the upflow tube, at which time the liquid flows into the space in the separator hood next to the upflow tube (i.e. below the partition), subsequently leaving the separator hood via the liquid outlet;

b. the liquid flows over the partition in that portion of the riser located next to, but outside of, the space over the upflow tube and then plunges from that part of the riser into the part of a downcomer having no bottom which is located next to and outside of the space over the upflow tube, so that the liquid can flow directly into the space of the separator hood next to the upflow tube (i.e. below the partitions), subsequently leaving the separator hood via the liquid outlet.

With the apparatus according to the invention, the liquid at the top of the upflow tube and in the risers will generally show some tendency to foam and having a lower specific gravity than that in the downcomer. In a typical operation, the liquid level in the riser will almost come to the upper edges of the partitions, whereas the liquid level in that part of the downcomer which is located next to the space over the upflow tube will in most cases having fallen to below the partitions, i.e. remain below the top edge of the upflow tube. It will, however, be apparent that the relative positioning of the liquid levels in the apparatus of the invention will also depend on the surface area of the passages in riser and downcomer and on the rate of discharge via the liquid outlet, as well as on the level control, if any.

According to the invention the partitions traverse the space directly above the upflow tube and the space bounded by the separator hood next to but outside of the top of the upflow tube. The risers have bottoms in the space next to the space over the upflow tube and the downcomers have bottoms in the space over the upflow tube. The bottoms are therefore fitted both to the partitions and to the upflow tube. This construction will prevent any liquid flowing from the upflow tube direct into a downcomer and from a riser direct into the space next to the upflow tube. Thus the liquid is invariably forced to flow over the edge of a partition, which edge acquires the function of an overflow edge.

By installing a greater number of partitions, which also increases the number of riser and downcomers, the overall length of the overflow edge is increased. It will be clear that the overflow edge can be made many times longer than it is when the top of the upflow tube itself is used as (circular) overflow edge. The number of partitions is limited by the consideration that the compartments must have a certain minimum width to be effective in the separation of gas and liquid.

According to a preferred embodiment of the invention, all the partitions have horizontal top edges and all these top edges lie in one plane. This embodiment will usually be chosen because it is the simplest one to fabricate and has the advantage that all parts of the overflow edge are equally functional. However, it is possible to depart from this embodiment and yet to retain at least part of the advantages of the invention.

According to the invention, the partitions are preferably placed in a radial position from the center of the upflow tube. This construction is preferred especially when upflow tube and separator hood have a circular cross-section, which will usually be the case when an elevated pressure is used in the upflow tube. A radial position of the partitions is of advantage in that all the risers and/or downcomers can be identical and can be equally spaced around the circumference of the upflow tube, so that the risers and the downcomers, repectively, are all equally loaded with liquid when the separator is in operation.

A disadvantage of the radial position of the partitions is that the compartments will not be equally wide everywhere. It is also possible for instance to place the partitions parallel, but then special measures have to be taken on two sides of the separator hood, were the partitions cannot traverse both the space over the upflow tube and the space next to it.

When the partitions are placed radially, it may be preferable not to have them extend over the upflow tube as far as the center point of the cross-section of the upflow tube. In this less preferred embodiment, a series of wedge shaped compartments are formed which touch at the center point of the upflow tube leaving very little space for gas and liquid separation in this center area. Thus, the top of each compartment near the center point of the upflow tube will contribute very little to the desired separation of gas and liquid.

When, as indicated above, the partitions forming the riser and downcomer compartments do not extend as far as the center point of the upflow tube cross-section, then according to the invention, each partition is preferably connected, over the upflow tube, at the ends of the two adjacent partitions by a lateral partition. With this embodiment, there will be some measure of structural rigidity in the compartments and, in the case of the downcomers, the lateral partition may function as an overflow edge for the liquid coming up centrally through the upflow tube. The lateral partitions of the downcomers are attached with their lower edges to the bottoms of the downcomers; while the upper edges of these lateral partitions may be level with the upper edges of the radial partitions. Unless it is undesirable for structural reasons, the lateral partitions of the risers may be omitted; they do not contribute to the overall length of the overflow edge.

In another preferred embodiment of the invention, the partial bottom portions of the riser and downcomer compartments slope downwards in the direction of that part of the upflow tube wall which is located under the compartment, which has its bottom over the part of the compartment adjacent to and outside of the top of the upflow tube, the bottom slopes down inwards towards the center of the upflow tube, whereas the bottom of the downcomer compartment, which is located in the space over the upflow tube, slopes down outwards. This embodiment is particularly preferred when the mixture to be separated also contains solid particles, for example, a slurry reactor, for Fischer-Tropsch hydrocarbon synthesis, where the phase to be separated from the gas phase comprises the hydrocarbon product of an auxiliary liquid containing solid catalyst particles. This embodiment is also desirable for those gas-liquid separations where no dead corners or spaces can be allowed in the separator hood.

The spacing of the partitions with the preferred radial orientation of the riser and downcomer compartments in accordance with the invention will depend to a large degree on the proportions of gas and liquid in the mixture being separated. In cases where a relatively large quantity of liquid is being separated from the gas, it is preferred that the two partitions forming a riser include an angle of less than 15° and the two partitions forming a downcomer include an angle of more than 15°. In contrast, when a relatively small quantity of liquid is being separated from a gas phase, the two partitions forming a riser preferably include an angle of more that 15° and the two partitions forming a downcomer preferably include an angle of less than 15°.

It will be clear that, when the partitions are placed radially and riser and downcomer have equal angles, the surface areas of the passages in riser and downcomer are determined by the diameters of the upflow tube and the separator hood (provided that the partitions traverse both the space over the upflow tube and the space next to it). In order to keep the diameter of the separator hood as small as possible, it is advisable to make the angle included by the partitions forming a downcomer compartment large with respect to the angle included by the partitions forming a riser compartment. On the other hand, the overall length of the overflow edge decreases when the total number of compartment decreases. In addition, the ratio between the passage of the riser and that of the downcomer must not deviate too much from the value dictated by the ratio between the quantities of gas and liquid to be separated, otherwise, space will be lost. A total number of twelve risers and twelve downcomers has been found to be a good compromise; in which case a riser and an adjacent downcomer together occupy an angle of 30°.

According to another preferred embodiment of the invention, the partitions forming the riser and downcomer compartments extend as far as the wall of the separator hood. This simplifies the construction since the separator hood then forms the required back wall of the riser compartments when the partitions and riser bottoms are attached to the separator hood wall. However, it is pointed out that more complicated embodiments are also possible. Thus, in an alternative design, the riser compartments may be constructed such that a strip of the riser bottom adjacent to the separator hood is omitted with the required back wall of the riser compartments then being formed by a second lateral partition which connects the two partitions forming the riser compartment at the location where the riser bottom terminates. In this way, additional downcomers are formed which are entirely located in the space adjacent to, but outside of, the overflow edge being formed by these lateral partitions.

The invention also relates to a slurry reactor comprising a reaction zone made up of a vertically oriented upflow tube which empties by an overflow edge at the top of the upflow tube into a separator hood fitted over and around said upflow tube, which separator hood has a gas outlet the overflow edge and a liquid outlet below the overflow edge and outside of the upflow tube, said liquid outlet being connected via a cooling device placed outside the reaction zone to the bottom of the reaction zone, said reaction zone bottom also being fitted with a gas inlet. In this slurry reactor the construction of the separator hood and overflow edge is in accordance with any of the above-mentioned embodiments of the invention. Such a slurry reactor is suitable for synthesizing a product that is liquid under the synthesis conditions by catalytic conversion of a gas in the presence of a recycled product containing a catalyst. The recycled liquid with the catalyst, together with the gas, is passed upwards through the reaction zone and in the separator hood the unconverted gas, together with gaseous reaction products is separated from the liquid containing the catalyst, which liquid is cooled outside the reactor and subsequently recycled to the bottom of the reactor. Part of the liquid is carried off as product.

Another application of the slurry reactor is the one in which from a gas a gaseous product is synthesized with the aid of a catalyst suspended in a recirculating auxiliary liquid. The gases are then separated from the auxiliary liquid. Alternatives to the two above-mentioned applications of the slurry reactor are, for instance, those in which the external cooling of the liquid separated from the gas is omitted, in which the separated liquid is not recycled or in which, during the product separation, the catalyst is left in the reactor.

For slurry reactors in accordance with the invention, the liquid discharge facilities in the separator hood preferably comprise at least four discharge lines equally spaced around the circumference of the separator hood, each connected to the bottom of the reactor via a separated heat exchanger. This embodiment is preeminently suitable for use in the synthesis of one or more hydrocarbons from a gas containing hydrogen and carbon monoxide. In this "Fischer-Tropsch" synthesis, a considerable amount of heat is generated in the reactor which can be efficiently removed in the way indicated above.

The invention will now be further elucidated with reference to the accompanying Figures.

Figure 1:
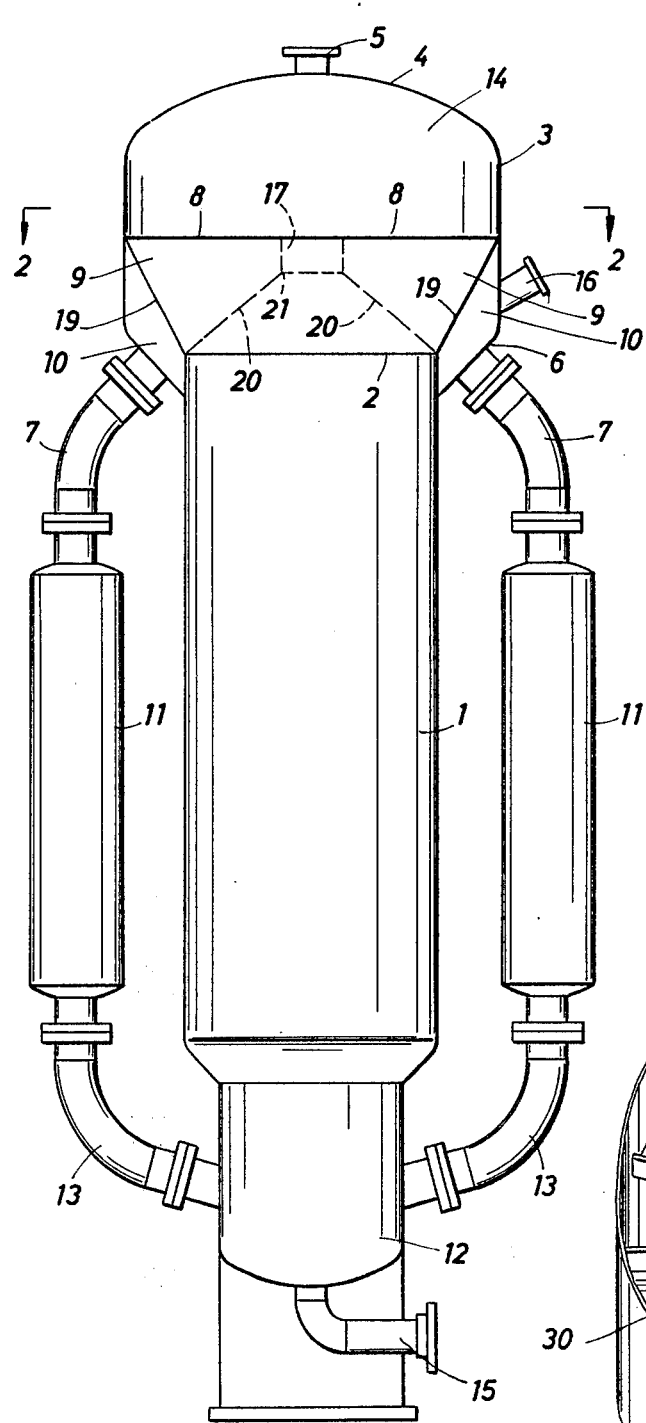
FIG. 1 is a schematic longitudinal section through a slurry reactor with separator hood in accordance with an embodiment of the invention.

With reference to FIG. 1, first a short description will be given of the principle of the slurry reactor according to an embodiment of the invention.

The slurry reactor, 1, is constructed as a cylindrical upflow tube, i.e. in the vertical reactor vessel 1, such that a liquid phase, containing catalyst particles, and a gaseous phase flow upwards. The upper edge, 2, of the reactor vessel 1 has been cut off straight, so the upper edge, 2, is circular and lies in a horizontal plane.

On top of and around the upper part of reactor vessel 1, a separator hood 3 has been fitted, the diameter of the separator hood being larger than that of reactor vessel 1. The top of hood 3 is closed by a cover, 4, with a central gas outlet 5. The underside of hood 3 is closed by a cover, 4, with a central gas outlet 5. The underside of hood 3 is located adjacent to and outside of the upper edge 2 of vessel 1 and is constructed as a bottom, 6, sloping down in an inwards direction towards the center of the upflow tube, 1. This bottom 6 has outlets to four liquid discharge pipes 7, two of which are visible in the drawing.

In the space directly above upflow tube 1 and in the space next to it, hood 3 has a system of vertical partitions — to be further described hereinafter with reference to FIGS. 2 and 3 — which together generate a system of overflow edges lying in the horizontal plane 8 through the upper edges of the vertical partitions 9. The liquid and the gas flow from vessel 1 between certain pairs of vertical partitions 9 upwards to plane 8, where the liquid plunges over the overflow edges and flows between other pairs of vertical partitions downwards into annular space 10 under plane 8 next to the space directly above reactor 1. From annular space 10 the liquid flows down through discharge pipes 7 to heat exchangers 11 and from there to the bottom 12 of reactor 1 via pipes 13.

The gas phase which is separated from the liquid during overflow of the liquid in hood 3 collects in space 14 above plane 8 and is removed from it via outlet 5. At the bottom 12 of reactor 1 fresh gas is supplied via inlet tube 15.

With this slurry reactor it is possible to synthesize, for instance, a hydrocarbon from synthesis gas containing $H_2$ and CO supplied via tube 15, by passing liquid product containing suspended catalyst required for the synthesis together with the gas, upwards through reactor 1. At the top of reactor 1, the unconverted gas and the gaseous reaction products are separated in hood 3 from the liquid containing catalyst and discharged via tube 5. Simultaneously, the liquid product and catalyst are recycled via tube 7, heat exchanger 11 and tube 13 to the bottom 12 of the reactor, the product and catalyst being cooled in exchanger 11, with excess product and any catalyst to be regenerated being removed via discharged nozzle 16 from hood 3. In the synthesis of hydrocarbons external cooling is often desirable because of the highly exothermic character of the reactions.

Figure 2:
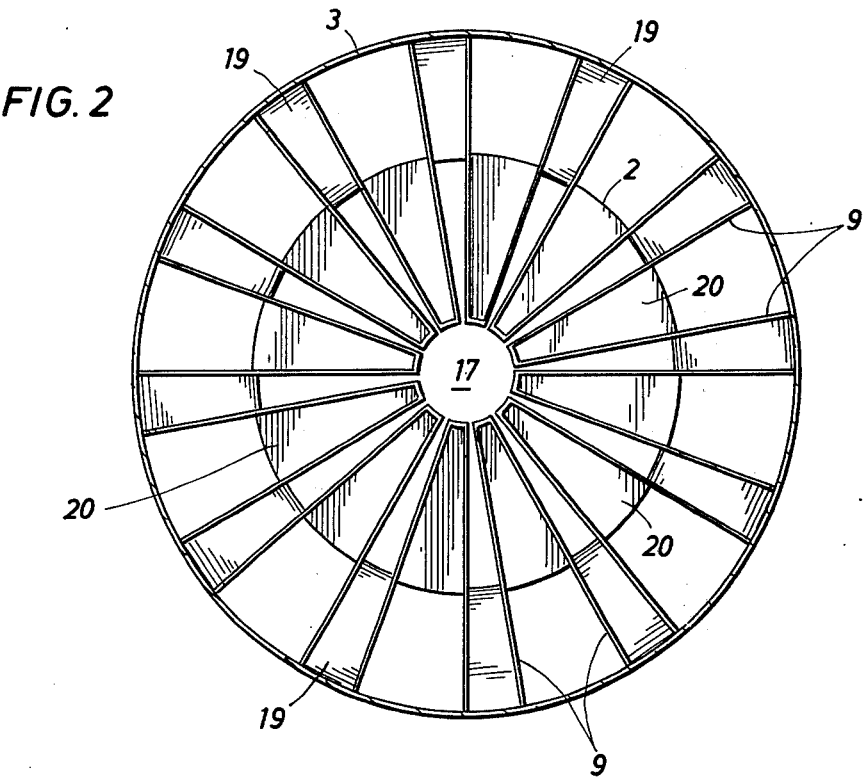
FIG. 2 is a cross-section, on a large scale, according to line I—I in FIG. 1.
Figure 3:
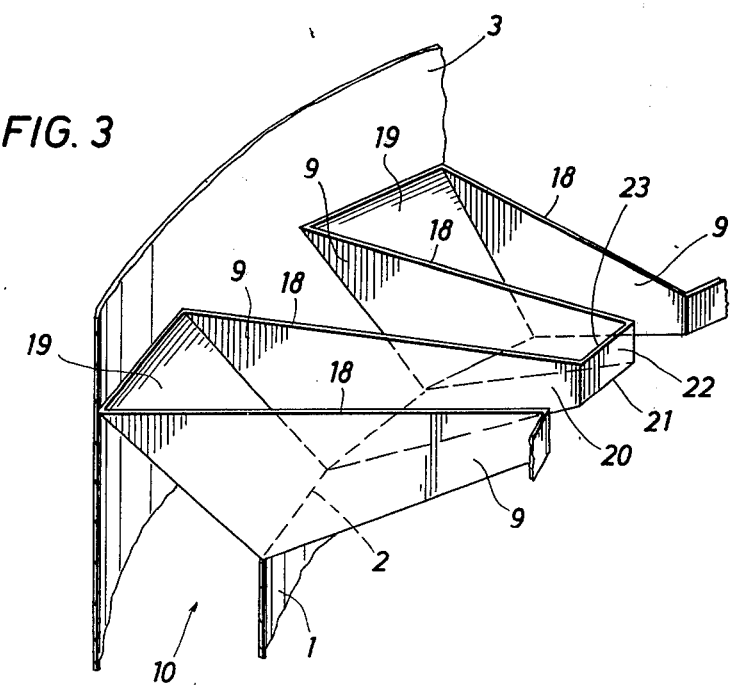
FIG. 3 shows a schematic perspective of part of the interior of the separator hood according to FIGS. 1 and 2.

With reference to FIGS. 2 and 3 a further description will now be given of the construction of the system of partitions in hood 3 of the apparatus according to FIG. 1.

As is apparent from the top view of FIG. 2, the vertical partitions 9 have been placed radially in hood 3 in a particular manner. They extend in plane 8 from the wall of hood 3 to a cylindrical opening 17 which is in the center of hood 3. Partitions 9 form adjacent pairs including a smaller and a larger angle, respectively 10° and 20°.

Upper edges 18 of partitions 9 in plane 8 form overflow edges (see FIG. 3). Between two adjacent partitions 9 making an angle of 10°, a bottom 19 is present between the wall of hood 3 and upper edge 2 of upflow tube 1, which bottom slopes down inwards because it adjoins the wall of hood 3 at the level of plane 8, i.e. at the level of upper edges 18 of vertical partitions 9, whereas it adjoins upper edge 2 of upflow tube 1 some distance below this plane 8. Bottom 19 ends at edge 2, i.e. between the vertical partitions referred to there is no bottom in the space over tube 1.

Between two adjacent partitions 9 making an angle of 20°, a bottom 20 is present in the space over tube 1, which bottom extends upwards from upper edge 2 of tube 1 to cylinder 17. The bottom begins at the level of upper edge 2 and ends at cylinder 17, some distance below plane 8, in an edge 21. From edge 21 a lateral partition 22 rises vertically to plane 8, i.e. to the level of the upper edges 18 of partitions 9. Bottoms 20 are located in the space over upflow tube 1, so they do not extend into the space next to it enclosed by the separator hood. Bottoms 19 and 20 as well as partitions 22 have been welded in place between partitions 9.

As a result of this construction, two kinds of compartments have been formed between partitions 9, specifically:

a. riser compartments between partitions 9 which include an angle of 10°, which riser compartments are open at the bottom in the space over upflow tube 1 and closed at the bottom in the space adjacent to but outside of the top of the upflow tube (bottoms 19).

b. downcomer compartments between partitions 9 which include an angle of 20°, which downcomer compartments are closed at the bottom in the space over upflow tube 1 (bottoms 20) and open at the bottom in the space adjacent to but outside of the upflow tube. Moreover, in the space over upflow tube 1 the downcomer compartments, when viewed in a radial direction, are closed at the inside (lateral partitions 22).

The operation of the system of partitions and bottoms described and depicted is as follows:

In FIG. 3 three compartments are shown in perspective, of which the foremost is a riser compartment, the middle one a downcomer compartment and the hindmost a riser compartment again.

The liquid phase and the gas flow from reactor 1 between partitions 9 of the riser compartments and in the space inside the circle of lateral partitions 22 upwards to overflow edges 18 and 23. As the phases flow over these edges a separation takes place, the gas being removed in an upward direction while the liquid flows down in the downcomer compartments between partitions 9 and 22, eventually arriving in space 10 beside reactor 1 and flowing downwards therefrom.

Because of the special shape of the riser compartments - which widen upwards - any potential expanding mass of foam in hood 3 can be readily handled, while owing to the sloping position of bottoms 19 and 20 there are no dead corners in which catalyst particles can be trapped.

Figure 4:
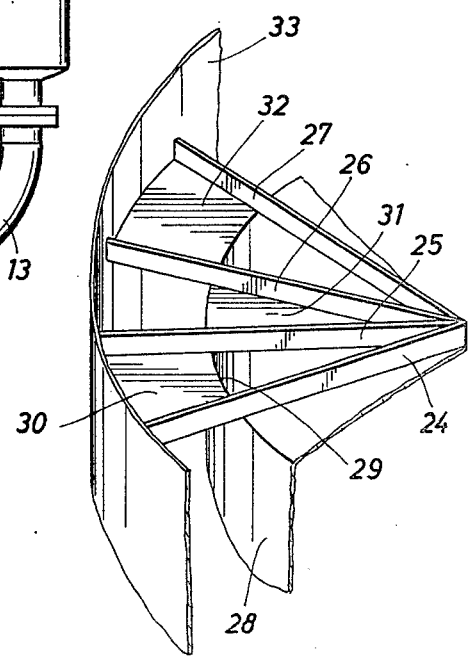
FIG. 4 shows a schematic perpsective of part of the interior of a separator hood corresponding to that of FIG. 3 according to another embodiment of the invention.

FIG. 4 shows a greatly simplified embodiment of the construction according to FIG. 3. Two riser compartments are visible, which are bounded by radial partitions 24 and 25 and by radial partitions 26 and 27, respectively. Between partitions 25 and 26 there is a downcomer compartment.

Wall 28 of the reactor ends at the top in a horizontal circular edge 29 to which bottoms 30, 31 and 32, or a riser, a downcomer and a riser, respectively, have been connected by welding. The bottoms are all in one plane,—i.e., the plane through edge 29 and through the lower edges of partitions 24 up to and including 27.

Bottoms 31 tapers off to a point in the center where the partitions meet. Bottoms 30 and 32 extend from edge 29 to wall 33 of the separator hood.

The top edges of partitions 24 up to and including 27 lie in one horizontal plant and form overflow edges.

Above this plane, inside wall 33, is the gas-collecting space, below the plane between walls 28 and 33 is the liquid discharge space.

We claim as our invention:

1. An apparatus for separating gas and liquid from a gas-liquid mixture which comprises a vertically oriented, central upflow tube opening at its upper end into a separator hood which is fitted over and around the upper end of said upflow tube thereby providing an enclosed space above the upper end of the upflow tube for gas collection and an enclosed space outside and below the upper end of the upflow tube for liquid collection, said separator hood being equipped with a gas outlet above the upper end of the upflow tube and a liquid outlet below the upper end of the upflow tube; liquid communication between the upflow tube and the separator hood being provided by an overflow edge at the upper end of the upflow tube, said overflow edge being comprised of a series of vertically oriented partitions which traverse the space directly above the upflow tube and extend outwardly into the space adjacent to the upper end of the upflow tube bounded by the separator hood, thereby dividing the lower portion of the space in the separator hood into a series of adjacent, open top compartments of alternating types, one type of compartment being a riser which is bottomless in the space over the upflow tube and which has a bottom in the space outside the upper end of the upflow tube such that the gas-liquid mixture being separated can flow in an upwards direction into and over the upper edge of the compartment and the other type being a downcomer which has a bottom in the space over the upflow tube and is bottomless in the space outside the upper end of the upflow tube such that the liquid portion of the liquid mixture being separated can flow in a downwards direction from the upper edge of the compartment into the liquid collection space bounded by the separator hood, the arrangement of adjacent riser and downcomer compartment being such that any liquid being separated from the gas-liquid mixture in the upflow tube first passes through a riser compartment and over a partition into a downcomer compartment before it passes into the liquid collection space bounded by the separator hood outside and below the upper end of the upflow tube.

2. An apparatus according to claim 1, wherein all the partitions have horizontal upper edges and all these upper edges lie in one plane.

3. An apparatus according to claim 2, wherein the partitions are placed in a radial position from the center point of the upflow tube.

4. An apparatus according to claim 3, wherein the partitions over the upflow tube do not exceed as far as the center point of the upflow tube.

5. An apparatus according to claim 4, wherein the end of each radial partition is connected over the upflow tube with the end of one of the two adjacent partitions by a lateral partition.

6. An apparatus according to claim 1, wherein each bottom slopes downwards in the direction of that part of the upflow tube wall which is located under the compartment belonging to that bottom.

7. An apparatus according to claim 3, wherein the two partitions forming a riser include an angle of less than 15° and the two partitions forming a downcomer include an angle of more than 15°.

8. An apparatus according to claim 3, wherein the two partitions forming a riser include an angle of more than 15° and the two partitions forming a downcomer include an angle of less than 15°.

9. An apparatus according to claim 1, wherein the partitions extend as far as the wall of the separator hood.

* * * * *